April 1, 1952  J. C. DENIS  2,590,947
LIQUID LEVEL GAUGE
Filed Oct. 8, 1949
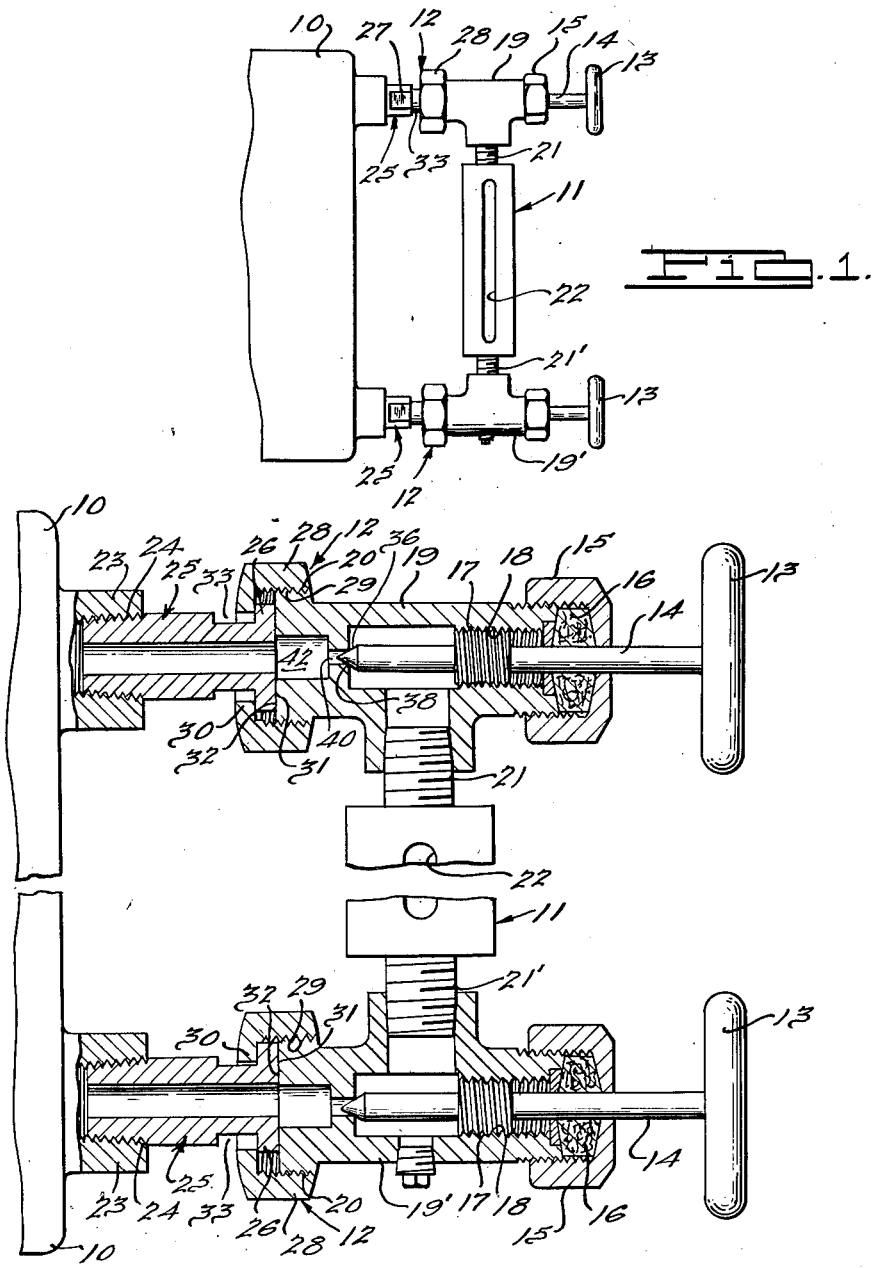
INVENTOR.
Jean Charles Denis.
BY
Harness, Dickey & Pierce
ATTORNEYS Patented Apr. 1, 1952

2,590,947

UNITED STATES PATENT OFFICE 2,590,947

LIQUID LEVEL GAUGE

Jean Charles Denis, Detroit, Mich., assignor, by mesne assignments, to Buffalo Eclipse Corporation, a corporation of New York Application October 8, 1949, Serial No. 120,301

3 Claims. (Cl. 73—332)

The present invention relates to combined liquid level gauge and coupling assemblies for connection to liquid-containing vessels, such as water columns, tanks, boilers and the like.

Direct-reading liquid level gauges of the columnar-type, where intended to withstand substantial pressures, are manufactured with relatively heavy metallic bodies, the liquid being visible through a narrow strip-like window of heavy glass. Another common type of columnar gauge, intended for lower pressures, employs a body comprising a cylindrical glass tube. Both such types of columnar gauges are ordinarily furnished with two valves and two complete sets of supporting and coupling portions, one for each end. In the case of the metal-bodied gauges, all such parts are preassembled by the manufacturer, and the dimensions of the assembly are fixed and not readily changeable in the field. The glass tube type of low pressure gauge is usually so constructed as to permit limited longitudinal adjustment of the valves and coupling portions with respect to the glass tube, to vary the spacing between the coupling portions. This provides for fine adjustments, while glass tubes of different lengths are also substitutable to provide for coarser adjustments of length.

Liquid-containing vessels intended for the reception of such columnar types of liquid level gauges must, as a practical matter, be furnished with fixedly positioned ports or nipples to which a gauge (usually made by a different manufacturer) is adapted to be coupled. Installation of the gauge is effected after the more massive liquid-containing vessel is installed in its intended setting. The gauge body is mounted vertically, while the coupling portions for connection to the vessel are substantially horizontal, so that even a slight discrepancy between the spacing of the coupling portions and of the ports or nipples of the vessel, renders it difficult or impossible to connect the gauge. As will be recognized by those skilled in the art, it is not practical, in view of service conditions, and on account of costs, to make such metallic-bodied gauge structures adjustable as to dimensions. It is of course equally impractical to provide for adjustment of the positioning of the horizontal coupling ports or nipples of the liquid-containing vessel. While it is possible to substitute vertical gauge-body connecting nipples of different lengths, this is not only troublesome and time-consuming, but does not permit of fine or accurate adjustment, so that proper connection of such gauges remains difficult even under the best conditions.

The invention overcomes the difficulties outlined, and facilitates the connection of all types of columnar liquid level gauges, rendering it unnecessary even in the case of glass tube gauges, to resort to the more cumbersome expedient of adjusting the valve bodies along the glass tube, while in the case of the metal-bodied gauges an adaptability previously entirely unattained is achieved. The primary object of the present invention may accordingly be summarized as the provision of improved means for connecting liquid level gauges to liquid-containing vessels, despite considerable variation in the dimensioning or spacing of the parts to be connected.

Another object is to provide an improved gauge and coupling assembly which requires no special or individual adjustment on the part of the fitter, and which may be installed and connected to parts of dissimilar dimensions just as easily as if the parts fitted perfectly and despite substantial differences in the spacing of the coupling portions of the gauge and vessel, yet which insures secure and liquid-tight coupling of the parts.

Still another object is to provide such an improved gauge and coupling assembly which, by reducing the necessity for the costly and time-consuming practices inherently requisite in the maintenance of extreme accuracy during manufacture, substantially reduces the overall cost of manufacture of such complete gauge and coupling assemblies.

It is also an object of this invention to provide an improved gauge and coupling assembly which is adapted to be more quickly and economically installed under practical service conditions than presently known devices of the same class.

Other objects and advantages of the invention will become apparent upon consideration of the present disclosure in its entirety.

In the drawing:

Fig. 1 is an elevational view of a direct-reading columnar liquid level gauge provided with coupling means constructed in accordance with the present invention, fragmentarily showing a liquid-containing vessel upon which the gauge is installed; and Fig. 2 is a view upon a larger scale and centrally broken away showing the coupling portions and adjacent parts in substantially central vertical section.

Referring now to the drawing, reference character 10 designates a water-containing receptacle which is shown only diagrammatically and which may comprise, in a typical installation, the water column of a boiler operating at substantial pressure. The gauge body, which is generally designated 11, is also illustrated more or less diagrammatically, since its precise details form no part of my present invention, but it is presumed to be of relatively heavy metallic construction. A relatively narrow transparent sight glass 22 forms an elongated window in the body through which the liquid may be directly observed.

The gauge body 11 is rigidly supported by nipples 21, 21', which connect it, respectively, to upper and lower valve bodies 19, 19'. Nipples 21 and 21' are equipped at their opposite ends with tapered pipe threads, and they may be welded to the gauge body and to the valve bodies to insure permanent seals. It will be recognized that such nipple joints do not afford a practical means for accurate adjustment of the overall length of the assembly.

The upper and lower valving and coupling portions may be essentially similar in construction, so that description of one will suffice for both.

Although both at the top and the bottom the valve body joins the gauge body to the coupling means per se, and in effect the valve body actually forms a part of the coupling means, the details of the valving means form no part of my present invention and may vary widely. In the construction shown, each valve assembly includes a handwheel 13, a valve stem 14, a packing nut 15, and packing gland 16. Threads 17 are provided on a portion of the valve stem 14 for engagement with threads 18 on the inner surface of the housing 19, so that in response to rotation of the handwheel, the valve portion 36 may be moved to and from engagement with a seat 38 formed at one extremity of axial passage 40 which communicates with a port 42 which is also axially positioned and which opens horizontally at the end of the valve body opposite to that which carries the handwheel. The ported end of the valve body is provided with external threads 29 and with an accurately finished flat face 31.

The valve body is adapted to be connected to the vessel 10 by a tail pipe 25, the outer end of which is provided with a flange 26 terminating in a flat face 32 adapted to bear against the face 31 of the valve body. Flange 26 is adapted to be tightly held against the ported end of the valve by a coupling nut 28 having a threaded portion 20 adapted to overengage the threads 29 of the valve body and also having a shoulder 30 which inwardly overhangs flange 26, so that when the coupling nut is tightened, the surfaces 31, 32 are held in sealing engagement with one another. It will be noted that the internal diameter of the portion of the coupling nut which surrounds the flange 26 is of substantially greater diameter than such flange, and that the inwardly overhanging shoulder 30 of the coupling nut is substantially greater in diameter than the portion of the tail pipe surrounded thereby, so that substantial lateral displacement of the tail pipe with respect to the valve body is possible when the coupling nut is loosened. The tail pipe is preferably formed of steel of relatively high tensile strength, and in the area thereof adjacent the flange 26 the diameter of the tail pipe is reduced, as by the formation of a peripheral slot or groove 33, into which the nut flange 30 may project. This arrangement provides for a greater degree of lateral adjustment in proportion to the outside dimensions of the nut and valve than would otherwise be possible. The reduction in wall thickness of the tail pipe in the region of the groove 33 is made possible by forming the tail pipe of hard material. The difference between the internal diameters of the coupling nut and the external diameters of the portions of the tail pipe overengaged thereby permits one of these parts to be displaced relative to the other without interfering with the rigidity or tightness of the connection.

At its other or supported end, the tail pipe is shown as provided with tapered male pipe threads adapted to engage a nipple portion 23 formed upon the receptacle 10. The corresponding lower connecting portions shown in the bottom half of Fig. 2 are illustrated in extreme laterally displaced positions representing maximum displacement. As shown, the tail pipe is displaced upwardly with respect to the valve fitting.

The internal diameter of the tail pipe may be less than the internal diameter of the valve port 42 to an extent corresponding to the maximum lateral displacement permitted by the parts. Where the liquid flow is from the tank to the gauge, such an arrangement avoids an obstacle to the free flow of liquid at the point of connection between the tail pipes and gauge. It will be apparent that if the pipes are of equal internal diameter, a displacement of one will cause a portion of the valve fitting to protrude into the path of the liquid flowing from the tank to the gauge. Further providing for a relatively smaller internal diameter in the tail pipe makes possible a relatively wider bearing surface on flange 26 for abutment against the end bearing surface 31 of the valve fitting to compensate for the latter's relatively wide outside diameter.

The degree of lateral displacement provided for, in the manner described, in the fittings of such a combined gauge and coupling assembly, may be such as to take into account the maximum discrepancies which are apt to be encountered in service, but it will be observed that each coupling assembly need only accommodate one-half of such maximum displacement, where two complete adjustable coupling assemblies are provided as in the preferred embodiment herein disclosed.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

I claim:

1. A combined liquid level gauge and multiple coupling assembly comprising a columnar gauge body, a pair of valve bodies, one valve body being arranged at each end of the gauge body, and coupling means for connecting each valve body to a liquid-containing receptacle or the like, at least one of said coupling means comprising a coupling section carried by the valve body and having a port therein disposed upon an axis substantially perpendicular to the columnar gauge body, said port interiorly communicating through the valve body with the gauge body, a relatively wide, substantially flat terminal seat formed upon said coupling section and substantially perpendicular to the axis of said port, a tubular coupling portion adapted for connection to such a liquid-containing receptacle and having a terminal flange and a flat seat forming one side of the flange, said last-mentioned seat forming in effect an enlarged end of said tubular coupling portion, said last-mentioned seat and flange being of lesser diameter than the first-mentioned seat but of greater diameter than said port, a hollow coupling nut securable to said coupling section of the valve body and having a bridging portion to extend around said flange and an overhanging portion adapted to overengage and extend inwardly beside an outer face of said flange to retain the same and thereby prevent separation of said tubular coupling portion and valve body, the internal diameter of the bridging portion of the coupling nut being substantially greater than the external diameter of said flange, the minimum diameter of the overhanging portion of said nut being substantially greater than the outside diameter of the part of the tubular coupling portion encircled thereby but of lesser diameter than said flange.

2. A liquid level gauge for a liquid-containing vessel provided with spaced tapped ports, said gauge comprising a transparent, substantially vertical conduit portion and lateral end conduit portions each adapted to be connected to one of said ports for fluid passage therethrough, at least one of said lateral end conduit portions comprising a tail pipe provided on one end thereof with threads for engagement with one of said tapped ports and being provided on the other end thereof with a flange, a second pipe adapted to be connected at one end thereof to said transparent conduit portion and being provided on the other end thereof with threads, and a coupling nut which is internally threaded on one end for engagement with the threads of said second pipe and is provided on its other end with a bearing shoulder adapted to engage the flange on said tail pipe, wherein the internal diameter of the threaded portion of the coupling nut is substantially larger than the outer diameter of said flange and the internal diameter of the bore of the bearing shoulder is substantially larger than the outer diameter of said tail pipe.

3. A combined liquid level gauge and multiple coupling assembly comprising a columnar gauge body, a pair of valve bodies, one valve body being arranged at each end of the gauge body, and coupling means for connecting each valve body to a liquid-containing receptacle or the like, each coupling means comprising a coupling section carried by the valve body and having a port therein disposed upon an axis substantially perpendicular to the columnar gauge body, said port interiorly communicating through the valve body with the gauge body, a relatively wide, substantially flat terminal seat formed upon said coupling section and substantially perpendicular to the axis of said port, a tubular coupling portion adapted for connection to such a liquid-containing receptacle and having a terminal flange and a flat seat forming one side of the flange, said last-mentioned seat forming in effect an enlarged end of said tubular coupling portion, said last-mentioned seat and flange being of lesser diameter than the first-mentioned seat but of greater diameter than said port, a hollow coupling nut securable to said coupling section of the valve body and having a bridging portion to extend around said flange and an overhanging portion apertured to surround the coupling portion and overengaging and extending inwardly beside an outer face of said flange to retain the same and thereby prevent separation of said tubular coupling portion and valve body, the internal diameter of the bridging portion of the coupling nut being substantially greater than the external diameter of said flange, the part of said coupling portion surrounded by the overhanging portion of the nut being reduced in diameter with respect to the aperture in the overhanging portion and with respect to other parts of the tubular coupling portion whereby the nut and coupling portion are laterally shiftable with relation to one another to and from a position wherein the overhanging portion projects laterally into the reduced part of the coupling portion.

JEAN CHARLES DENIS.

REFERENCES CITED

The following references are of record in the file of this patent:

UNITED STATES PATENTS

| Number | Name | Date |
| --- | --- | --- |
| 1,362,257 | Mattingly | Dec. 14, 1920 |